(12) United States Patent
Li

(10) Patent No.: US 8,730,170 B2
(45) Date of Patent: May 20, 2014

(54) ERGONOMIC COMPUTER MOUSE

(76) Inventor: Weicheng Li, Beijing (CN)

( * ) Notice: Subject to any disclaimer, the term of this patent is extended or adjusted under 35 U.S.C. 154(b) by 0 days.

(21) Appl. No.: 12/931,506

(22) Filed: Feb. 3, 2011

(65) Prior Publication Data

US 2012/0001850 A1    Jan. 5, 2012

(51) Int. Cl.
*G09G 5/08* (2006.01)

(52) U.S. Cl.
USPC .......................................... 345/163

(58) Field of Classification Search
USPC .................................. 345/156–184
See application file for complete search history.

(56) References Cited

U.S. PATENT DOCUMENTS

| | | | | |
|---|---|---|---|---|
| 5,870,081 | A * | 2/1999 | Wu | 345/163 |
| 6,275,215 | B1 * | 8/2001 | Kim | 345/163 |
| 6,664,947 | B1 * | 12/2003 | Vinogradov | 345/163 |
| 2001/0022578 | A1 * | 9/2001 | Giles et al. | 345/163 |
| 2005/0030285 | A1 * | 2/2005 | Fu | 345/157 |
| 2007/0139376 | A1 * | 6/2007 | Giles | 345/163 |
| 2008/0143677 | A1 * | 6/2008 | O'Keeffe et al. | 345/163 |
| 2010/0265179 | A1 * | 10/2010 | Ram | 345/163 |

OTHER PUBLICATIONS

Logitech G50 Vanguard http://www.coroflot.com/defound/Logitech-G50-Vanguard.*

* cited by examiner

*Primary Examiner* — Quan-Zhen Wang
*Assistant Examiner* — Chun-Nan Lin
(74) *Attorney, Agent, or Firm* — Ming Chow; Sinorica, LLC

(57) ABSTRACT

A healthcare mouse is a computer mouse with a keypad that has an operational direction of horizontal back-and-forth movement, which is different from the vertical up-and-down movement of a traditional mouse's keypad. The healthcare mouse includes a shell, a keypad on the shell with an inner rod, a core circuit board inside the shell, and a click switch that is inside the shell and contacts the inner rod of the keypad through its touch top. The click switch and the core circuit board are electrically connected to each other. The keypad is disposed on the stand-up part of the front end of the shell in a way that enables it to move only fore and aft. The technical configuration of the healthcare mouse allows the user's finger to stay in a completely natural and relaxed flexuous or straight state while the healthcare mouse is not being clicked.

1 Claim, 5 Drawing Sheets

ERGONOMIC COMPUTER MOUSE

FIELD OF THE INVENTION

The utility model relates to the technical field of mouse, particularly to a healthcare mouse.

BACKGROUND OF THE INVENTION

The long-term use of a computer mouse can hardly avoid the injury of hands, arms, shoulders and other locations of human body. This consequence is universal and sometimes is rather serious, so it is dubbed "mouse hand".

The reason is that according to the current design of the operation of mouse keypads, the mouse will be switched "ON" when the key is pressed down and "OFF" when the key is released upward. In correspondence, the mouse will be switched "ON" when the finger presses the key down and "OFF" when the finger lifts.

As the down pressing direction of a finger is same as the direction of gravity and natural relaxation, the workload of finger muscle and tendon is very light during down pressing; whereas as the lifting direction of a finger is adverse to the direction of gravity and natural relaxation, the workload of finger muscle and tendon increases obviously during lifting. In most of the use time, a mouse is in OFF state. In other words, the finger has to be lifted for a long time. This causes flagrant strain and injury of finger tendon and muscle.

In prior art, some mouse have been designed to address mouse hand, such as: magnetic healthcare mouse, drug-magnetic healthcare mouse, infrared healthcare mouse, foot controlled healthcare mouse and vertical hand-held mouse. These mice have the defects like unobvious improvement, complex structure, high mold and production cost, large size and inconvenient use.

During the realization of the utility model, the inventor discovered the prior art had at least the following problems: During the use of a mouse, the finger of the operator is in a strained and non-relaxed lifting state when the mouse in OFF state which takes up the best part of the time. It is extremely likely that this may cause strain and injury of finger tendon and muscle; or even if they have certain healthcare function, they also have the defects like unobvious improvement, complex structure, high mold and production cost, large size and inconvenient use.

SUMMARY OF THE INVENTION

In order to keep operator's finger in a natural and relaxed (flexuous or straight) state when the mouse is in an OFF state which takes up most of the mouse use time, simplify the structure of healthcare mouse, reduce production cost and not change operator's use habit, the utility model provides a healthcare mouse, its the technical scheme is as follows:

A healthcare mouse, comprising a shell, a keypad on the shell and with an inner rod, a core circuit board inside the shell, and a click switch that is inside the shell and contacts the inner rod of the keypad through the touch top of the click switch. The click switch and the core circuit board are electrically connected. The keypad is disposed on the stand-up part of the front end of the shell in a way that enables it to move only fore and aft.

In order to realize the foregoing utility model object in a better way, the utility model may also include the following technical scheme: The upper fringe of the keypad is connected to the shell, the click switch is disposed on the core circuit board in a fixed way, the moving direction of the touch top is same as that of the inner rod.

In order to realize the foregoing utility model object in a better way, the utility model may also include the following technical scheme: After the keypad and the said inner rod are connected through thread, the keypad is disposed on the stand-up part of the front end of the shell in a sliding way, the click switch is disposed on the core circuit board in a fixed way, the moving direction of the touch top is same as that of the inner rod.

In order to realize the foregoing utility model object in a better way, the utility model may also include the following technical scheme: One side fringe of the keypad is connected to the shell, the click switch is disposed on the core circuit board in a fixed way, the moving direction of the touch top is perpendicular to that of the inner rod, the end of the inner rod that contacts the touch top is a sliding press-down slope.

In order to realize the foregoing utility model object in a better way, the utility model may also include the following technical scheme: An angle regulating board is disposed at the front end of the shell, the angle regulating board is connected to the shell through two fastening bolts at two ends, the keypad is disposed on the angle regulating board, the click switch is disposed on the inner side of the angle regulating board in a fixed way, the moving direction of the touch top is same as that of the inner rod.

In order to realize the foregoing utility model object in a better way, the utility model may also include the following technical scheme: The keypad and the shell are molded to form an integral body.

In order to realize the foregoing utility model object in a better way, the utility model may also include the following technical scheme: The keypad and the angle regulating board are molded to form an integral body.

In order to realize the foregoing utility model object in a better way, the utility model may also include the following technical scheme: A protuberant finger rest is disposed at the bottom of front end of the shell.

The wholesome effect of the technical scheme provided by the embodiments of the utility model: through installing the keypad on the stand-up part of the front end of the shell in a way that enables it to move only fore and aft, the technical scheme provided by the embodiments of the utility model changes the operational direction of the mouse keypads from vertical up-and-down movement into horizontal back-and-forth movement. Consequently, the finger is in a completely natural and relaxed flexuous or straight state in the period when the mouse is shut off, and it applies a horizontal or quasi horizontal force on the keypad only when the mouse in ON state, thus significantly reducing the long-standing workload of finger muscle and tendon during mouse operation and avoiding the strain and injury of hands, arms, shoulders and other locations of human body resulting from the use of mouse; the mouse has a simple structure, low production cost and doesn't change operators' use habit.

BRIEF DESCRIPTION OF THE DRAWINGS

In order to more clearly illustrate the technical scheme provided by the embodiments of the utility model, the drawings used in the embodiments are briefly described below. Obviously the following drawings are some examples of the utility model. Those of ordinary skill in the art may also acquire other drawings according to these drawings without paying creative labor.

In drawings, the components for which the mark numbers stand are listed below:

| 1. shell; | 2. keypad; | 3. inner rod; |
|---|---|---|
| 4. touch-top; | 5. click switch; | 6. core circuit board; |
| 7. finger rest; | 8. angle regulating board; | 9. fastening bolt. |

DETAILED DESCRIPTION OF THE EMBODIMENTS

Embodiment 1

Figure 1:
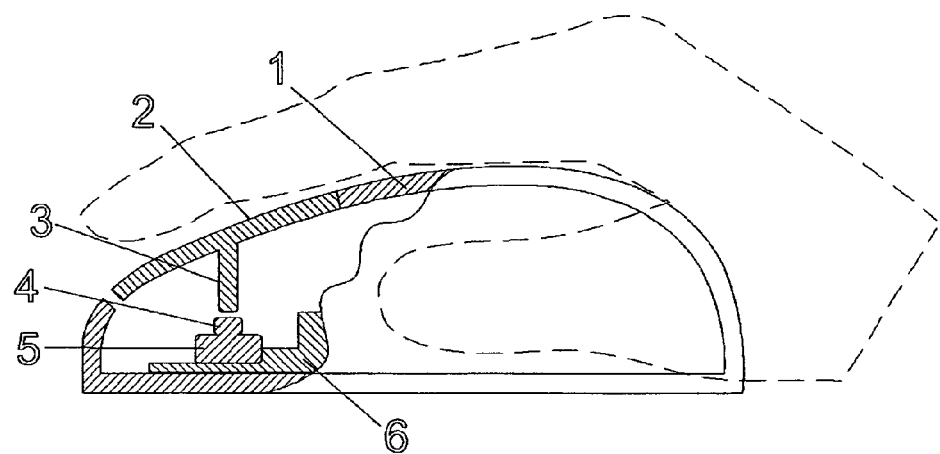
FIG. 1 is a structural schematic of the mouse in prior art.
Figure 2:
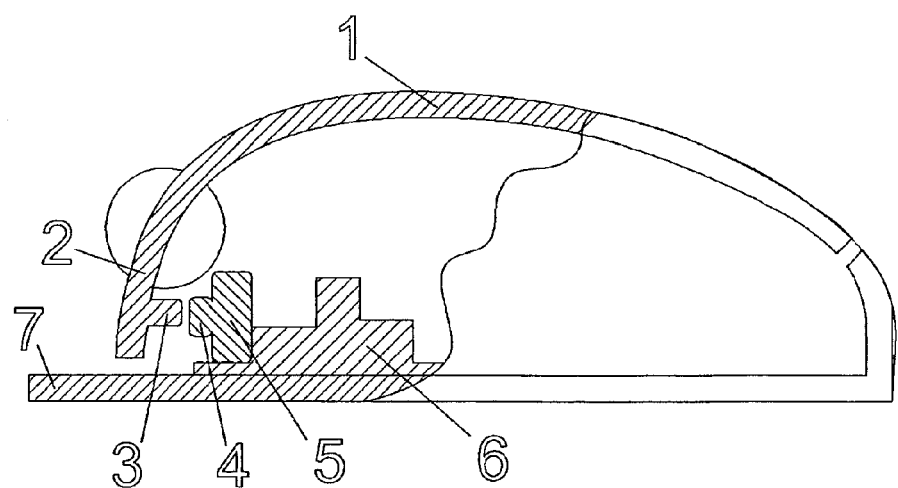
FIG. 2 is a front structural view of Embodiment (1) of the utility model.
Figure 3:
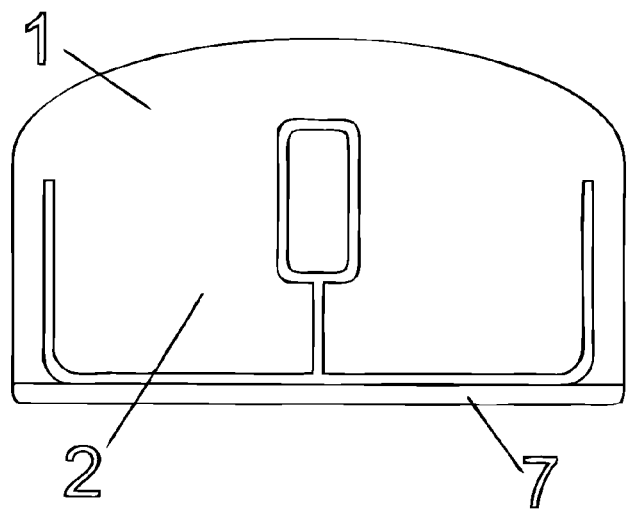
FIG. 3 is a side view of FIG. 2.

FIG. 2 and FIG. 3 are a front-view structural schematic and a side view provided by Embodiment (1) of the utility model, respectively. The technical scheme: it comprises a shell 1, a keypad 2 on the shell 1 and with an inner rod 3, a core circuit board 6 inside the shell 1 and a click switch 5 that is inside the shell 1 and contacts the inner rod 3 of the keypad 2 through the touch-top 4 of the click switch 5. The click switch 5 and the core circuit board 6 are electrically connected. The keypad 2 is disposed on the stand-up part of the front end of the shell 1 in a way that enables it to move only fore and aft. The upper fringe of the keypad 2 and the shell 1 are connected and molded to form an integral body. The click switch 5 is disposed on the core circuit board 6 in a fixed way. The moving direction of the touch-top 4 is same as that of the inner rod 3; a protuberant finger rest 7 is disposed at the bottom of front end of the shell 1.

The keypad 2 is disposed on the stand-up part of the front end of the shell 1 in a way that enables it to move only fore and aft. In other words, the keypad 2 is disposed on the stand-up part of the front end of the shell 1 and guarantees the operational direction during its use is only fore and aft movement, thereby in ON state, the operational direction of the existing mouse is changed from vertical up-and-down movement into horizontal or quasi horizontal back-and-forth movement, while in OFF state, the state of the finger is changed from a strained and non-relaxed lifting state in prior art into a natural and relaxed flexuous or straight state, thereby thoroughly eliminating the workload of finger muscle and tendon in OFF state. Further, in ON state, the finger hooks backward and is perpendicular to the gravity direction of the finger and the workload of muscle and tendon is very light. Therefore, the workload of finger muscle and tendon is greatly reduced during the use of the mouse and the strain and injury of hands, arms, shoulders and other locations of human body caused by the use of the mouse are effectively avoided.

The moving direction of the touch-top 4 is same as that of the inner rod 3. In other words, the touch-top 4 is directly controlled through the horizontal movement of the vertical end face of the inner rod 3.

The protuberant finger rest 7 is disposed at the bottom of front end of the shell 1 to prevent the front end of the finger from rubbing the table top, thereby more effectively protecting the finger.

Embodiment 2

Figure 4:
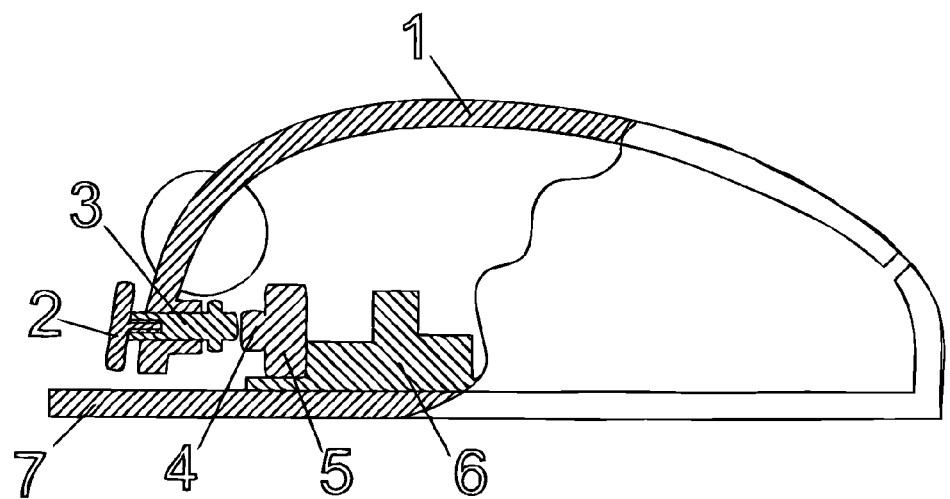
FIG. 4 is a front structural view of Embodiment (2) of the utility model.
Figure 5:
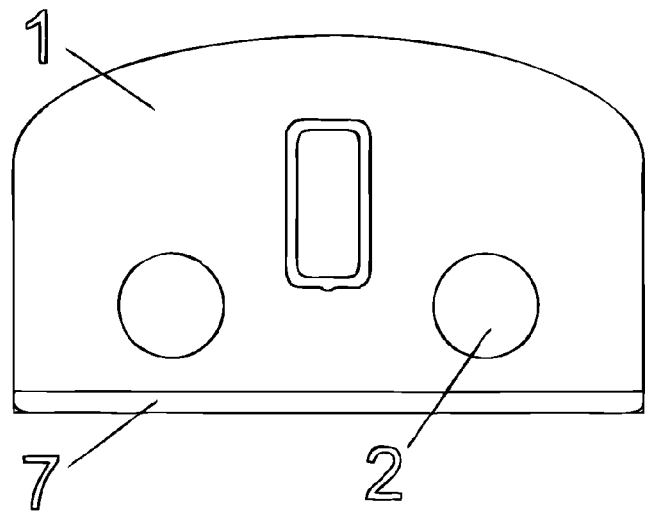
FIG. 5 is a side view of FIG. 4.

FIG. 4 and FIG. 5 are a front-view structural schematic and a side view provided by Embodiment (3) of the utility model, respectively. The technical scheme: it comprises a shell 1, a keypad 2 on the shell 1 and with an inner rod 3, a core circuit board 6 inside the shell 1 and a click switch 5 that is inside the shell 1 and contacts the inner rod 3 through a touch-top 4 of the click switch 5. The click switch 5 and the core circuit board 6 are electrically connected. The keypad 2 is disposed on the stand-up part of the front end of the shell 1 in a way that enables it to move only fore and aft. After the keypad 2 is connected to the inner rod 3 through thread, it is disposed on the stand-up part of the front end of the shell 1 in a sliding way. The click switch 5 is disposed on the core circuit board 6 in a fixed way. The moving direction of the touch-top 4 is same as that the inner rod 3. A protuberant finger rest 7 is disposed at the bottom of front end of the shell 1.

The keypad 2 is disposed on the stand-up part of the front end of the shell 1 in a way that enables it to move only fore and aft. In other words, the keypad 2 is disposed on the stand-up part of the front end of the shell 1 and guarantees the operational direction during its use is only fore and aft movement, thereby in ON state, the operational direction of the existing mouse is changed from vertical up-and-down movement into horizontal or quasi horizontal back-and-forth movement, while in OFF state, the state of the finger is changed from a strained and non-relaxed lifting state in prior art into a natural and relaxed flexuous or straight state, thereby thoroughly eliminating the workload of finger muscle and tendon in OFF state. Further, in ON state, the finger hooks backward and is perpendicular to the gravity direction of the finger and the workload of muscle and tendon is very light. Therefore, the workload of finger muscle and tendon is greatly reduced during the use of the mouse and the strain and injury of hands, arms, shoulders and other locations of human body caused by the use of the mouse are effectively avoided.

The moving direction of the touch-top 4 is same as that of the inner rod 3. In other words, the touch-top 4 is directly controlled through the horizontal movement of the vertical end face of the inner rod 3.

The protuberant finger rest 7 is disposed at the bottom of front end of the shell 1 to prevent the front end of the finger from rubbing the table top, thereby more effectively protecting the finger.

After the keypad 2 is connected to the inner rod 3 through thread, it is disposed on the stand-up part of the front end of the shell 1 in a sliding way. In other word, after the inner rod 3 passes through a through hole on the stand-up part of the front end of the shell 1, it is connected to the keypad 2 through thread and can slide inside the through hole on the stand-up part of the front end of the shell 1.

Embodiment 3

Figure 6:
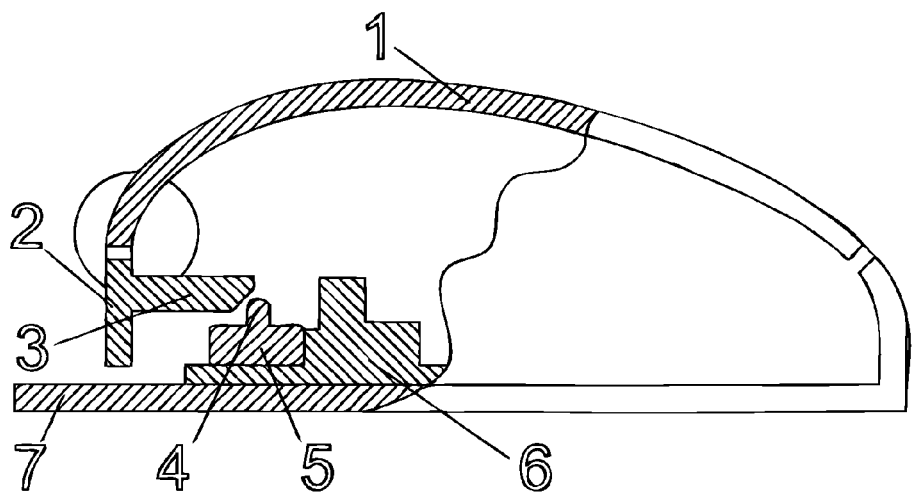
FIG. 6 is a front structural view of Embodiment (3) of the utility model.
Figure 7:
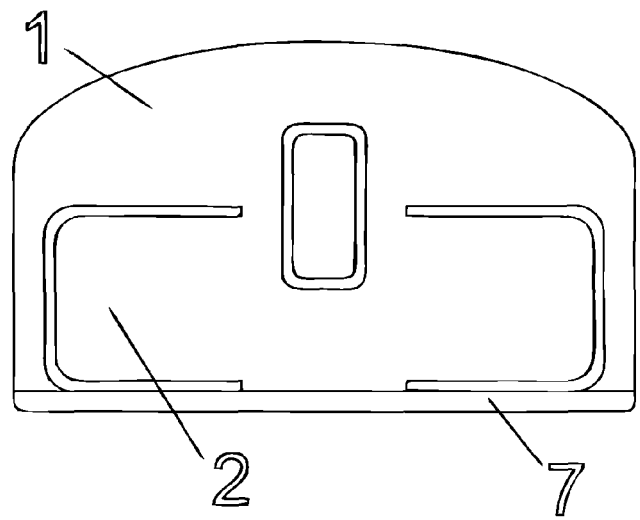
FIG. 7 is a side view of FIG. 6.

FIG. 6 and FIG. 7 are a front-view structural schematic and a side view provided by Embodiment (3) of the utility model, respectively. The technical scheme: it comprises a shell 1, a keypad 2 on the shell 1 and with an inner rod 3, a core circuit board 6 inside the shell 1 and a click switch 5 that is inside the shell 1 and contacts the inner rod 3 of the keypad 2 through a touch-top 4 of the click switch 5. The click switch 5 and the core circuit board 6 are electrically connected. The keypad 2 is disposed on the stand-up part of the front end of the shell 1 in a way that enables it to move only fore and aft; the (inner) central side fringe of the keypad 2 and the shell 1 are connected and molded to form an integral body. The click switch 5 is disposed on the core circuit board 6 in a fixed way. The moving direction of the touch-top 4 is perpendicular to that of the inner rod 3. The end of the inner rod 3 that contacts the touch-top 4 is a sliding press-down slope. A protuberant finger rest 7 is disposed at the bottom of front end of the shell 1.

The keypad 2 is disposed on the stand-up part of the front end of the shell 1 in a way that enables it to move only fore and aft. In other words, keypad 2 is disposed on the stand-up part of the front end of the shell 1 and guarantees the operational direction during its use is only fore and aft movement, thereby in ON state, the operational direction of the existing mouse is changed from vertical up-and-down movement into horizontal or quasi horizontal back-and-forth movement, while in OFF state, the state of the finger is changed from a strained and non-relaxed lifting state in prior art into a natural and relaxed flexuous or straight state, thereby thoroughly eliminating the workload of finger muscle and tendon in OFF state. Further, in ON state, the finger hooks backward and is perpendicular to the gravity direction of the finger and the workload of muscle and tendon is very light. Therefore, the workload of finger muscle and tendon is greatly reduced during the use of the mouse and the strain and injury of hands, arms, shoulders and other locations of human body caused by the use of the mouse are effectively avoided.

The moving direction of the touch-top 4 is perpendicular to that of the inner rod 3. The end of the inner rod 3 that contacts the touch-top 4 is a sliding press-down slope. In other words, when the inner rod 3 moves fore and aft, the horizontal movement of the inner rod 3 is changed into the vertical movement of the touch-top 4 through the sliding press-down slope at the end of the inner rod 3.

A protuberant finger rest 7 is disposed at the bottom of front end of the shell 1 to prevent the front end of the finger from rubbing the table top, thereby more effectively protecting the finger.

Embodiment 4

Figure 8:
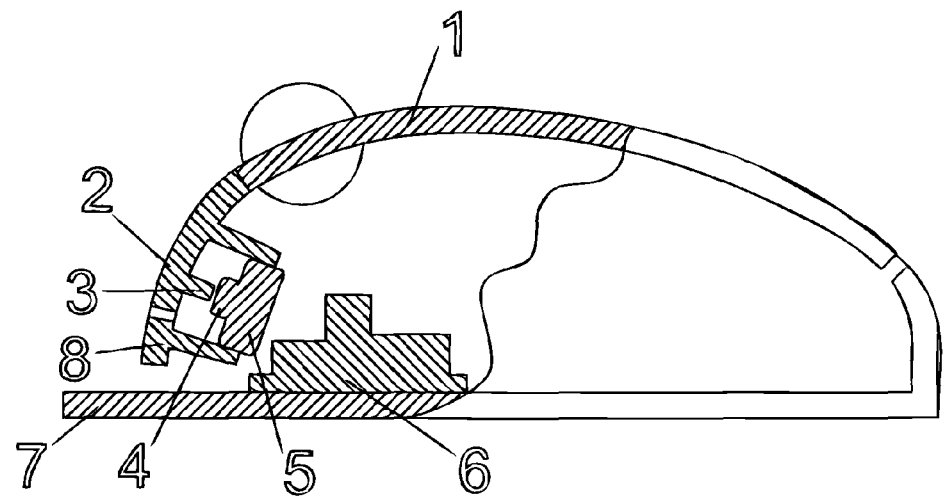
FIG. 8 is a front structural view of Embodiment (4) of the utility model.
Figure 9:
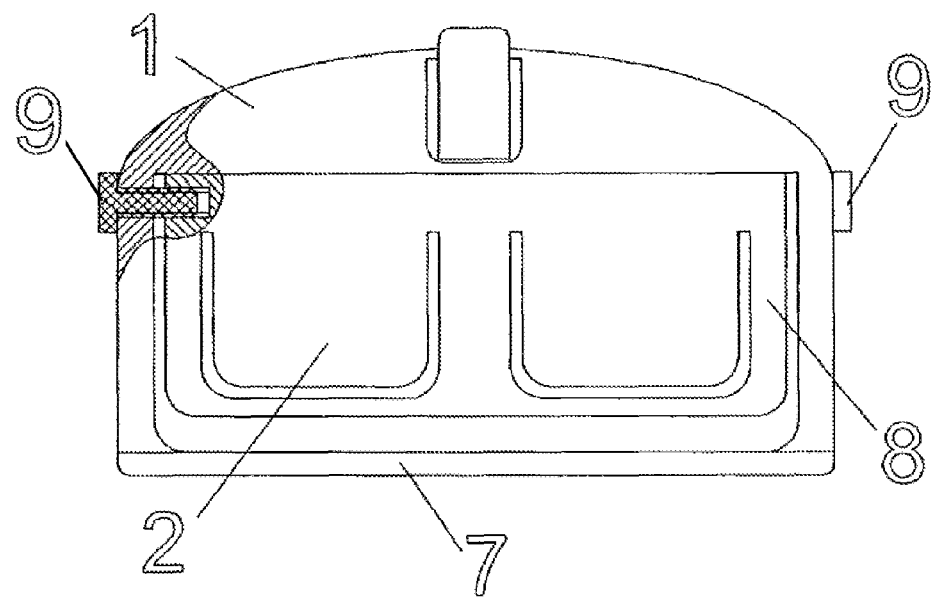
FIG. 9 is a side view of FIG. 8.

FIG. 8 and FIG. 9 are a front-view structural schematic and a side view provided by Embodiment (4) of the utility model, respectively. The technical scheme: it comprises a shell 1, an angle regulating board 8 is connected to the shell 1 through bolts 9 at the two ends as stand-up part of the front end of the shell 1, a keypad 2 with an inner rod 3 is disposed on the board 8 in a way that enables it to move only fore and aft, the keypad 2 and the board 8 are molded to form an integral body, a click switch 5 is disposed on the inner side of the board 8 in a fixed way and the switch 5 contacts the inner rod 3 through a touch-top 4 of the switch 5, a core circuit board 6 inside the shell 1 is electrically connected with the click switch 5.

The moving direction of the touch-top 4 is same as that of the inner rod 3. A protuberant finger rest 7 is disposed at the bottom of front end of the shell 1.

The keypad 2 is disposed on the stand-up part of the front end of the shell 1 in a way that enables it to move only fore and aft. In other words, keypad 2 is disposed on the stand-up part of the front end of the shell 1 and guarantees the operational direction during its use is fore and aft movement, thereby in ON state, the operational direction of the existing mouse is changed from vertical up-and-down movement into horizontal or quasi horizontal back-and-forth movement, while in OFF state, the state of the finger is changed from a strained and non-relaxed lifting state in prior art into a natural and relaxed flexuous or straight state, thereby thoroughly eliminating the workload of finger muscle and tendon in OFF state. Further, in ON state, the finger hooks backward and is perpendicular to the gravity direction of the finger and the workload of muscle and tendon is very light. Therefore, the workload of finger muscle and tendon is greatly reduced during the use of the mouse and the strain and injury of hands, arms, shoulders and other locations of human body caused by the use of the mouse are effectively avoided.

The angle regulating board 8 is disposed at the front end of the shell 1. The angle regulating board 8 regards the bolts 9 at the two ends as an axis. Its two ends are fixed and connected to the shell 1 through the bolts 9. When the bolts 9 are unscrewed, the angle between the angle regulating board 8 and the axis formed by the bolts 9 may be adjusted; thereby the comfort level of the use of the mouse is raised. After the adjustment, the bolts 9 are fastened.

The keypad 2 is disposed on the angle regulating board 8 and they are molded to form an integral body. The click switch 5 is disposed on the inner side of the angle regulating board 8. In other words, when the angle of the angle regulating board 8 is adjusted, the keypad 2 and the click switch 5 can be driven to rotate synchronously, their relative positions remain unchanged all the time, and the normal contact between the inner rod 3 and the touch-top 4 and the normal use of the mouse are not affected.

The moving direction of the touch-top 4 is same as that of the inner rod 3. In other words, the horizontal movement of the touch-top 4 is directly controlled through the horizontal movement of the vertical end face of the inner rod 3.

A protuberant finger rest 7 is disposed at the bottom of front end of the shell 1 to prevent the front end of the finger from rubbing the table top, thereby more effectively protecting the finger.

The foregoing the embodiments are the preferred embodiments of the utility model and not intended to limit the utility model. All modifications, identical replacements and improvements made without departing from the spirit and principle of the utility model shall be within the protection scope of the utility model.

The invention claimed is:

1. An ergonomic computer mouse comprising,
a shell;
a keypad on the shell with an inner rod;
a core circuit board inside the shell;
a click switch that is inside the shell and contacts the inner rod of the keypad through a touch top of the click switch;
the click switch and the core circuit board are electrically connected;
the keypad is disposed on a stand-up part of a front end of the shell enabling the stand-up part to move only towards and away from the back end of the shell;
a protuberant finger rest is disposed at a bottom corner of front end of the shell;
an upper fringe of the keypad is connected to the shell;
the upper fringe and a lower fringe are positioned opposite to each other on the keypad;
the click switch is disposed on the core circuit board as a permanent fixture on the core circuit board;
the keypad and the inner rod are connected by engaging a male threaded portion of the keypad to a female threaded portion of the inner rod, the keypad is disposed on the stand-up part of the front end of the shell such that the inner rod traversing through the front end of the shell, and a consequent moving direction of the touch top is same as a consequent moving direction of the inner rod;

a lateral fringe of the keypad is connected to the shell, wherein the lateral fringe is positioned in between an upper fringe and a lower fringe of the keypad, and a consequent moving direction of the touch top is perpendicular to a consequent moving direction of the inner rod, a press-down slope of the inner rod slidably contacts the touch top;

an angle regulating board is disposed at the front end of the shell, the angle regulating board is connected to the shell by two fastening bolts that are positioned opposite to each other on the angle regulating board, the keypad is disposed on the angle regulating board, the click switch is disposed on inner side of the angle regulating board in a fixed way, and a consequent moving direction of the touch top is same as a consequent moving direction of the inner rod;

the keypad and the shell are molded into a single piece of material in order to form an integral body that comprises both the keypad and the shell; and the keypad and the angle regulating board are molded into a single piece of material in order to form an integral body that comprises both the keypad and the angle regulating board.

* * * * *